United States Patent
Gruber et al.

[15] 3,656,140
[45] Apr. 11, 1972

[54] SOLID STATE TIMING CONTROL FOR SINGLE CYCLE PROGRESSIVE LUBRICATING SYSTEMS

[72] Inventors: Thomas J. Gruber, Chagrin Falls; William W. Lyth, Cleveland, both of Ohio

[73] Assignee: Eaton Yale & Towne Inc., Cleveland, Ohio

[22] Filed: Nov. 25, 1970

[21] Appl. No.: 92,896

Related U.S. Application Data

[60] Continuation of Ser. No. 696,948, Jan. 10, 1968, abandoned, which is a division of Ser. No. 461,018, June 3, 1965, Pat. No. 3,381,776.

[52] U.S. Cl..............................................340/270, 340/267
[51] Int. Cl.......................................................G08b 21/00
[58] Field of Search..................................340/270, 267, 271

[56] References Cited

UNITED STATES PATENTS 2,676,315   4/1954   Kyle......................................340/270
3,127,954   4/1964   Callahan et al.......................340/270

Primary Examiner—John W. Caldwell
Assistant Examiner—Michael Slobasky
Attorney—Teagno & Toddy

[57] ABSTRACT

A lubrication control system for dispensing a measured amount of lubricant within a predetermined period of time having a lubrication dispensing piston, an electronic timing circuit responsive to movement of the piston and a warning device controlled by the timing circuit for signalling a failure of the lubricating system to dispense an amount of lubricant within the predetermined time interval.

8 Claims, 10 Drawing Figures

SOLID STATE TIMING CONTROL FOR SINGLE CYCLE PROGRESSIVE LUBRICATING SYSTEMS

This is a continuation of Ser. No. 696,948, now abandoned filed Jan. 10, 1968 which was filed as a division of Ser. No. 461,018 filed June 3, 1965 and now U.S. Pat. No. 3,381,776 issued May 7, 1968.

This invention relates to lubricating systems and concerns particularly arrangements for monitoring lubricating systems supplying lubricant to a plurality of points so that assurance is given that all required points are lubricated.

Although the system of the invention is not limited thereto it is particularly well adapted to the monitoring of the lubrication of engine compressors.

One of the objects of the invention is to sense the operation of pistons in a single-line, progressive, metering manifold such as that represented, for example, by Higgins, U.S. Pat. No. 1,834,433, and to do this without requiring any openings in the valve manifold or any packing glands.

A further object of the invention is to provide a timing arrangement for indicating continuously for each cycle of operation of the manifold whether the cycle is completed within a desired time.

Arrangements have been proposed for indicating the operation of lubricating metering valves of the oscillating piston type in which one or more of the pistons has a projecting indicator rod or stem, projecting through a gland or suitable packing to prevent leakage around the projecting indicator rod. In order to provide automatic response to the operation, a mechanical limit switch may be provided which is actuated by the projecting valve-piston stem.

Difficulty is encountered in obtaining reliable long-time sealing of such small indicator stems. All hydraulic packings are subject to wear, with attendant leakage around the rod, which is objectionable not only from a housekeeping standpoint, but may become severe enough so that the entire flow which is supposed to be subdivided by the manifold and directed to bearing points will leak out through the faulty packing. Additionally, there is no single suitable packing substance which is entirely compatible with the many various types of lubricating fluids and greases which may be used in metering valves of the type in question. Most seals used for this type of application are pressure sensitive, that is, the higher the pressure within the valve bore, the greater the sealing force on the indicator stem. When operating on extremely high pressures within a metering valve, the seal "drag" on the stem, being always high, tends to cause a rapid wear of both seal and stem, thus causing shortened life. Since the valve pistons are end pressure shuttled, packing "drag" on the indicator stem attached to a piston requires even more hydraulic force on the same or opposite end to move the piston, to overcome not only the normal resistance to piston movement (bearing back pressure) but also the resistance of the packing.

Piston rods also create the condition of unbalanced piston ends. Effective "pressure" of the piston is reduced by the cross section area of the stem which protrudes out to atmosphere, thus even more hydraulic pressure is required on the stem end to move the piston against a force on the opposite end. Pistons are, of course, available in a variety of diameters, whereas the diameter of the stem is usually one-eighth inch (0.0123 square inches cross section area). When a stem is attached to a piston of large diameter, the unbalanced area is of less importance; however, if the stem is attached to a piston of three-sixteenths inch diameter (0.0276 square inches area), it is obvious that the unbalanced areas are considerable. Because of this, it has been industry practice to limit the use of the indicator stem to pistons of approximately one-fourth inch diameter, or greater.

It is, accordingly, an object of the invention to avoid the limitations of projecting indicator stems. An object of the invention is to obtain advantages inherent in the use of switches fully enclosed in a vacuum and magnetically actuated, accomplishing long electrical and mechanical life.

Other and further objects, features and advantages of the invention will become apparent as the description proceeds.

In carrying out the invention in accordance with a preferred form thereof, several manifold valve blocks are clamped together, each having a cylinder containing a multiland piston which moves back and forth. The valves act sequentially; each piston moves from one end of its cylinder to the other after a previous piston has moved. Then after all pistons have moved, each one moves in a direction opposite to its previous movement. A complete cycle is completed and any one of the pistons moves from its original position to the opposite direction and back to its original position to complete a cycle.

In order to avoid the use of a projecting stem and a packing gland, a reed switch is provided which is responsive to the movement of the piston chosen as the indicator of cycle completion and the switch closes its contacts whenever the piston in question returns to the original position. The reed switch is a hermetically sealed switch composed of magnetic material such as those manufactured and sold by Hamlin of Lake Mills, Wisconsin, having two electrically conducting reed-form contacts which are normally open but which are attracted to each other to close when there is a magnet in the close vicinity. The piston rod which is to actuate the switch is either itself magnetized, or carries a magnet which attracts itself to the rod but which is fully enclosed, so as to actuate the reed switch whenever the piston moves to the end of its travel which is toward the location of the reed switch.

There is a lubricating pump which operates continuously and supplies a fixed amount of lubricant so that if everything is in order, the cycle will be completed within a given time and the reed switch will be actuated. To monitor the system or give an alarm whenever the cycle fails to be completed within the requisite time, a timing mechanism is employed which actuates an alarm unless the reed switch has closed its contacts, indicating completion of the lubricating cycle before the end of the time period established by the timing mechanism. The timing mechanism is a condenser-resistance circuit which fires a silicon controlled rectifier through a unijunction transistor control whenever the voltage across the condenser attains a predetermined value. The cathode and the anode of the silicon controlled rectifier are in circuit with the alarm. If the lubricating system is operating satisfactorily, the reed switch trips out the timing mechanism, discharging the condenser so that the alarm is never energized and, of course, after the condenser is discharged, the timing cycle starts over again. However, the reed switch is not connected directly to the condenser but to the control electrode of a solid state circuit which provides very rapid, very nearly instantaneous resetting or discharge of the condenser.

A better understanding of the invention will be afforded by the following detailed description, considered in conjunction with the accompanying drawing in which.

Like reference characters are utilized throughout the drawing to designate like parts.

Figure 1:
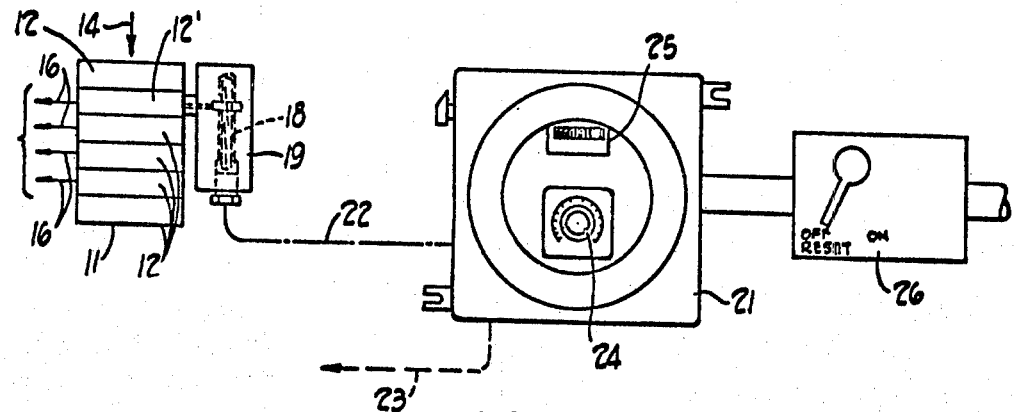
FIG. 1 is a schematic diagram of a lubricating valve manifold connected to a timing circuit through a magnetically operated dry reed switch which is hermetically sealed.
Figure 4:
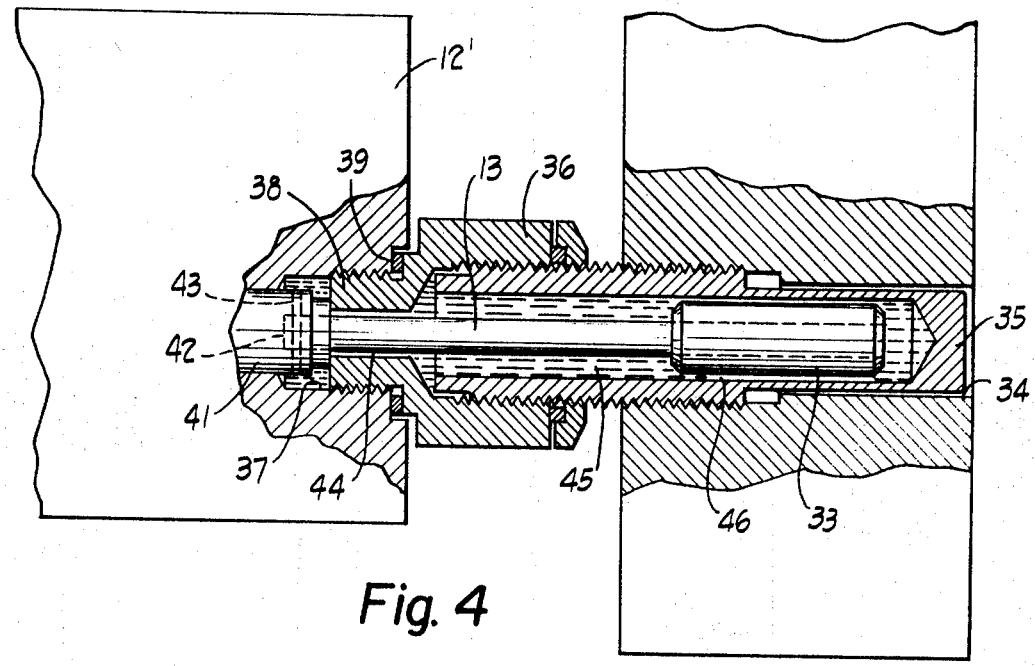
FIG. 4 is a detail view, partially in section, of one of the valve blocks and the switch housing with a portion broken away to expose, in sectional form, an end of the valve piston, a magnet securing itself thereto by magnetic attraction and a sealed magnet housing.
Figure 5:
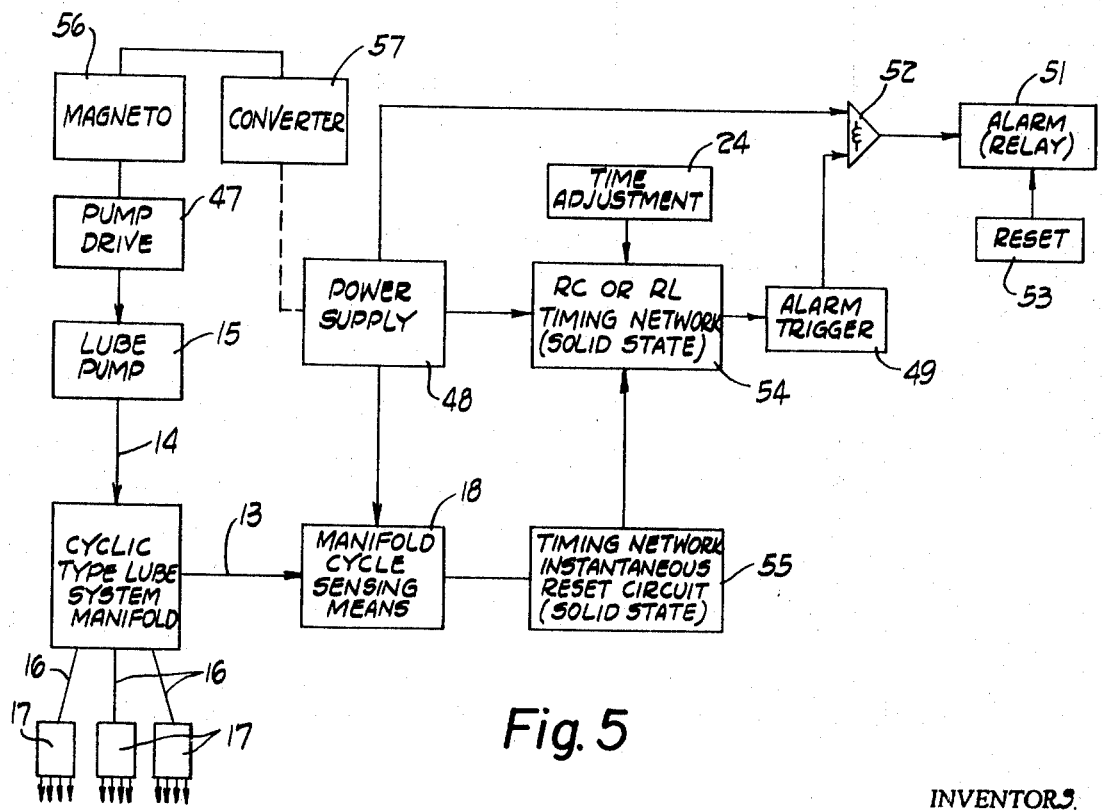
FIG. 5 is a block diagram of an embodiment of the monitoring system represented in FIG. 1.

As shown in FIG. 1, there is a lubricating valve manifold 11 comprising a plurality of valve blocks 12, one of which valve blocks 12' is provided with an indicator stem. The indicator stem 13 is shown in detail in FIG. 4. As indicated schematically in FIG. 1, lubricating valve manifolds 11 of the type involved are provided with a single lubricant inlet line 14 from a system oil pump 15 indicated schematically in FIG. 5. The manifold 11 has a plurality of output ports to output lines 16, indicated schematically in FIGS. 1 and 5. As indicated in FIG. 5, each output line 16 may in turn supply other manifolds 17.

As described more fully in Higgins, U.S. Pat. No. 2,834,433 and my co-pending application, Ser. No. 424,498 filed Jan. 11, 1965, now abandoned, in lubricating valve manifolds of the type indicated, each valve block may be provided with output ports at both ends with output lines from each end if desired or with one output port plugged so that there are output lines 16 from only one end of each valve block.

Magnetically responsive to the projection toward the right of the indicator stem 13 when the piston of the valve block 12' has moved to the right, is a reed switch, preferably a dry reed switch 18 hermetically sealed and mounted in a protective housing 19.

There is an explosion proof casing 21, containing a solid state timer and electric cycle totalizer, joined by a pair of conductors, indicated schematically in FIG. 1 by a line 22 to the dry reed switch 18. The details of the solid state timer contained within the casing 21 will be described more fully in connection with the description of FIG. 6. There is a schematically indicated line 23, to a magneto grounding relay (not shown). A timer adjustment 24 is provided and there is a register 25 for totalizing cycles of operation. There is a switch 26 for controlling the power supply to the unit 21.

Figure 2:
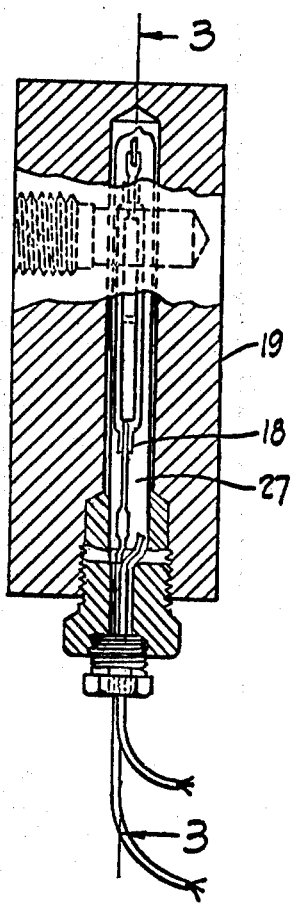
FIG. 2 is a view of a longitudinal section through the mounting for supporting a reed switch adjacent to the end of one of the valve blocks of FIG. 1.
Figure 3:
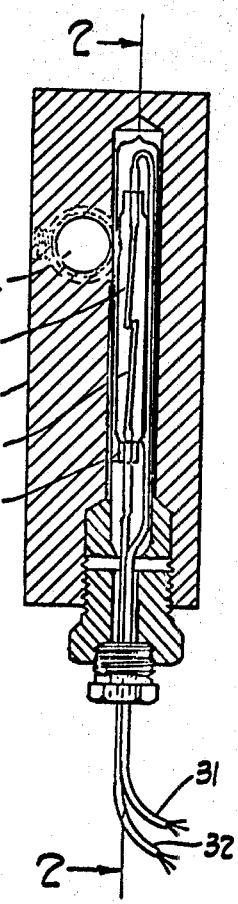
FIG. 3 is a view corresponding to FIG. 2 of a longitudinal section of the mounting, represented as cut by plane perpendicular to the section plane of FIG. 2.

As shown in FIGS. 2 and 3, the reed switch housing 19 has a chamber for receiving the reed switch 18, which is a unit hermetically sealed in glass and may take the form, for example, of the type DRG-1 reed switch manufactured by Hamlin, Inc. of Lake Mills, Wisconsin. The form shown is a normally open switch with a pair of flexible metal contacts or reeds. The housing 19 is formed with a chamber 27 to receive the reed switch 18.

Although the switch contacts 28 and 29 are coated with a suitable corrosion-resistant, high-electrical-conductivity metal, such as fold or silver, they are composed of a base of soft iron or the like, so that they are attracted toward one another to close an electrical contact between conductors 31 and 32 when a magnet 33 is brought in proximity to the reed switch contacts or blades 28 and 29. The magnet 33 is shown in FIG. 4. It may be actually attached to the indicator stem 13 or attracted thereto by its own magnetic force. The reed switch housing 19 is formed also with a chamber 34 of a suitable shape to receive a nonmagnetic magnet housing 35 shown in FIG. 4.

The fully enclosing magnet housing 35 is provided in order that the magnet will be fully enclosed in a chamber communicating with the interior of the valve block 12' without requiring any gland or valve packing for the indicator stem 13.

As shown in FIG. 4, an adapter body 36 is provided in order to enable the magnet housing 35 to be connected to the end of the valve block 12' which would normally contain a closing plug for the bore 37 of the valve block 12', were there no protruding indicator stem 13. The adapter body 36 is provided with a suitable fitting for maintaining a tight joint with the outer surface of the magnet housing 35. The portion of the adapter body 36 toward the left is formed as an externally threaded bushing 38 which enables the externally threaded bushing portion 38 to be threaded into an internally threaded end socket of the bore 37 in place of a conventional closing plug. Suitable means for sealing the joint with the bore 37 is provided, such as a copper gasket 39.

If desired, the indicator stem 13 may be secured to the end of the valve piston 41 by providing the end of the piston 41 with a socket 42 for receiving the left hand end of the stem 13. There may also be a transverse piston stem attachment pin 43 passing through both the adjacent ends of the pin 13 and the piston 41.

It will be observed that the bore for the piston 41 has a sufficient enlargement 37, the bushing portion 38 in the adapter body 36 is formed with sufficient clearance 44 and the chamber 45 for receiving the magnet 33 has sufficient diameter so that the indicator stem 13 and the magnet 33 do not interfere with the back and forth motion of the piston 41. The lubricant in the chamber 45 is free to flow around the magnet as the piston 41 moves back and forth.

The block diagram of FIG. 5 represents schematically the portions of the apparatus shown in FIGS. 1-4 together with blocks 47 representing the pump drive, 48 representing the power supply and other parts such as an alarm trigger 49. An alarm relay 51 may be provided which may take the form of a bell or a light or either solid state or electromechanical mechanism for shutting down the apparatus being lubricated. There is a suitable alarm control switch 52, schematically represented to show that the alarm relay 51 may be energized by the power supply 48 under the control of the alarm trigger 49. The alarm relay 51 may be the type provided with a reset 53.

As will be explained more fully hereinafter, the timing apparatus casing 21 of FIG. 1 contains a timing network 54 which may be of either the resistance condenser or the resistance inductance type, including solid state elements and a timing-network instantaneous reset circuit 55 which may also be of the solid state type.

The invention does not exclude the use of an independent power supply 48. However, if desired as indicated schematically in FIG. 5, the power supply 48 may be energized by a magneto 56 driven by the same drive 47 which drives the lubricating pump 15 and is provided with a suitable means such as a converter 57 to supply low voltage direct current in the power supply 48.

Figure 6:
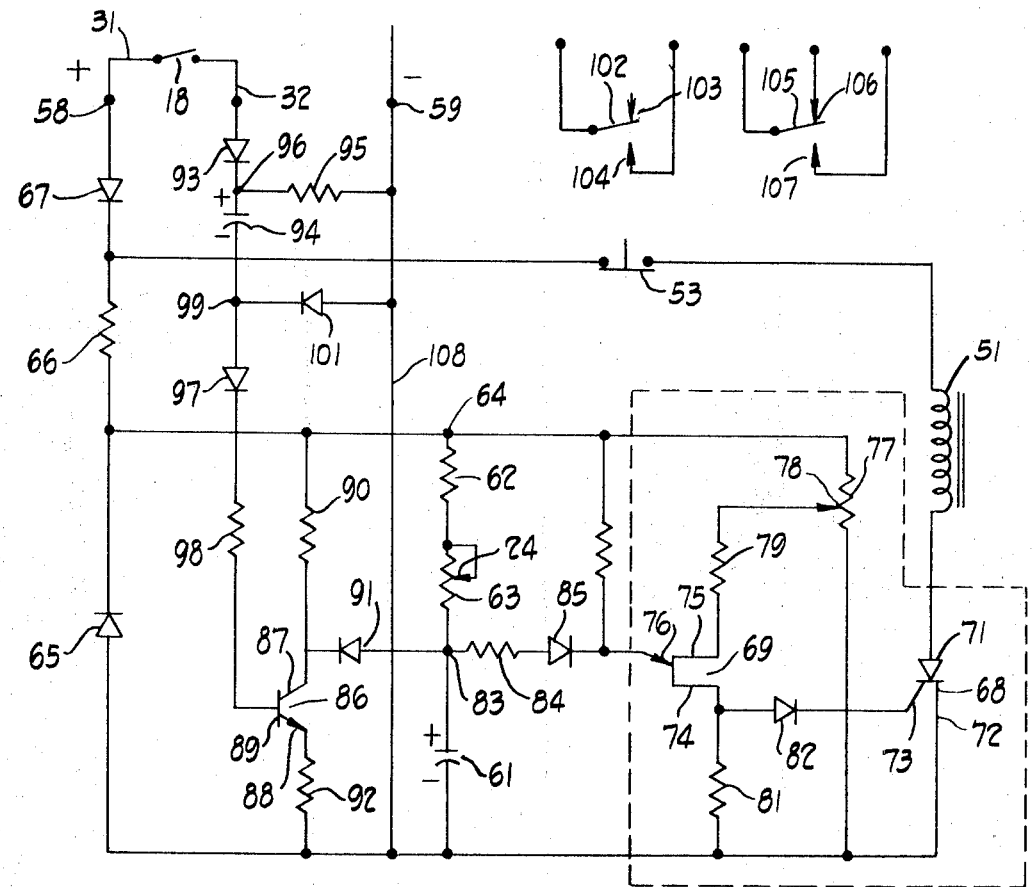
FIG. 6 is a circuit diagram of the electrical timing circuit employed in the apparatus of FIGS. 1 to 5.

The circuits forming the timer adjustment 24, the timing network 54 and the reset circuit 55 are shown in FIG. 6, an embodiment in which the timing network is of the resistance-condenser type. It is assumed for the sake of example that the power supply 48 provides direct current at 24 volts, with a positive terminal 58 and a negative terminal 59. A timing condenser 61 is connected to the positive terminal 58 in series with timing resistance including a fixed resistor 62 and a rheostat 63 which has an adjustable tap 24 which constitutes the time adjustment.

For the sake of precision in the timing operation, the positive voltage applied to the positive end terminal 64 of the fixed resistance 62 is regulated. This may be accomplished by connecting a suitable voltage regulator element such as a Zener diode 65 between the terminals 64 and 59, and connecting a swamping resistor 66 or a voltage dropping resistor 66 between the positive power supply terminal 58 and the regulated voltage terminal 64. The resistor 66 enables the Zener diode 65 to perform its regulating function in the event of fluctuations in the voltage occurring at the terminal 58. Preferably a solid state diode 67 is also connected in series with the terminal 58 in order to insure the application of correct polarity to the other elements.

In the embodiment illustrated in FIG. 6 the alarm trigger 49 of FIG. 5 takes the form of a silicon controlled rectifier (SCR) 68 controlled by a unijunction transistor 69, which in turn is responsive to the potential difference between the plates of the timing condenser 61.

The silicon controlled rectifier 68 comprises an anode 71, a cathode 72 and a gate 73. The unijunction transistor 69 has a grounded or base-one contact 74, a positively biased base-two contact 75 and an emitter 76.

The anode 71 and the cathode 72 of the silicon controlled rectifier 68 are connected in series with the alarm relay coil 51, a normally closed reset switch 53 and the solid state rectifier 67 between the positive power supply terminal 58 and the negative power supply terminal 59. The unijunction transistor 69, however, is excited by the regulated power supply across the Zener diode 65 by means of a potentiometer 77 connected across the Zener diode 65 and having an adjustable tap 78 connected to the base-two contact 75 of the unijunction transistor 69 through a load resistor 79. The base-one contact 74 is connected to the negative power supply terminal 59 through a resistor 81. For triggering the gate 73 of the silicon controlled rectifier 68 when the unijunction transistor 69 fires, the base-one contact 74 is connected to the gate 73 through a solid state rectifier 82, connected with such polarity that its cathode is connected to the gate 73.

In order to enable the unijunction transistor 69 to respond to the potential difference between the plates of the timing condenser 61, its emitter 76 is connected to the positive terminal 83 of the condenser 61 through a current limiting resistor 84 and a solid state diode 85 so poled that its cathode is connected to the emitter 76.

The instantaneous timing network 55 of FIG. 5, as shown in FIG. 6, comprises a discharge circuit for the condenser 61. This includes a transistor 86 shown as being of the NPN type having a collector 87, an emitter 88 and a base 89. The collector 87 is connected to the condenser terminal 83 through a solid state rectifier 91. A collector formed bias resistor 90 may be provided. The emitter 88 is connected to the negative power supply terminal 59 through a resistor 92.

The base 89 is arranged to be triggered by the closing of the reed switch 18. One of the conductors 31 of the reed switch 18 is connected to the positive power supply terminal 58, the other is connected through a solid state rectifier 93 and a resistance-capacity coupling circuit to the base 89 of the transistor 86. The resistance capacity coupling circuit includes a coupling condenser 94, and a resistor 95 connected between the negative power supply terminal 59 and the junction terminal 96 of the elements 93 and 94. An additional solid state rectifier 97 and a resistor 98 are connected in series between the negative-plate terminal 99 of the coupling condenser 94 and the base 89 of the transistor 86. In order to prevent negative surges of voltage applied to the base 89, a solid state rectifier 101 is also connected between the negative power supply terminal 59 and the negative plate terminal 99 of the condenser 94.

Any suitable alarm or safety shutdown apparatus may be actuated by the control winding 51. The control winding 51 has an armature (not shown) actuating contacts. As shown in FIG. 6, the control winding 51 has double-throw contacts. These may include a movable contact 102 cooperating with a normally closed stationary contact 103 and normally open stationary contact 104, and a movable contact 105 cooperating with a normally closed stationary contact 106 and a normally open stationary contact 107. The normally closed contacts 102 and 103 are connected in a suitable circuit for energizing a safe completion indicating such as a green light and the normally open contact 104 is connected in series with a warning indicator such as a red light. In like manner the normally closed contacts 105 and 106 may be connected in series with a control for holding an engine compressor in operation and contacts 105 and 107 may be included in a circuit for tripping out and shutting down such an engine compressor and other apparatus, lubrication of which is to be monitored and supervised by the illustrated apparatus.

As described in greater detail in Higgins, U.S. Pat. No. 2,834,433, when lubricant under pressure is applied to input line 14 of a lubricant manifold of the type represented by the manifold 11 in FIG. 1, pistons in the valve blocks are forced to move back and forth. The movement is sequential with each piston in succession being moved from one end of its cylindrical chamber to the other until all pistons of the manifold have been moved, when movement of each of the pistons, one at a time, in sequence, takes place in a direction opposite to the direction in which it moved previously. With each movement of a piston in one direction or another, lubricant is expelled through an output line, such as one of the output lines 16.

When the piston in the valve block 12' is moved to the right, the magnet 33 carried by the piston stem 13 moves into proximity to the reed switch 18. Magnetic flux induces an attraction between the two reeds 28 and 29, (FIGS. 2 and 3) so that they move together into contact. Thus the circuit is closed between conductors 21 and 32. The reeds make contact in spite of cantilever spring action, tending to keep them separated when no flux is present, and the current can flow through the conductors 31 and 32 in the circuit energized by the direct-current supply terminals 58 and 59. As the valve piston in the valve block 12' travels back and forth in the cyclic action of the manifold, the stem 13 following the piston movement alternately extends and retracts, operating the reed switch 18.

In the applicant's structure, since there is no packing, no packing glands being required, the effective "pressure" of the piston is not reduced by the cross sectional area of the stem which is not required to protrude out to atmosphere.

As the valve piston moves rightward and leftward in cycling, the stem 13 with the magnet 33 attached, follows the piston movement. Sufficient diametrical clearance is maintained between the tube bore and the magnet diameter in the area 46 so that the lubricating fluid which fills the tube, having entered easily through the clearance 44 around the stem 13, where it passes into the valve bore through the adapter body 38 can easily transfer back and forth past the magnet without dashpot effect.

When the valve piston moves leftward under hydraulic pressure applied to the right end, no loss of effective piston area is encountered because the hydraulic pressure is also present within the non-magnetic housing or tube 35 and operates with a leftward force on a magnet over an area equivalent to the area of the stem, thus making the hydraulic force on the end of the valve piston equal to the full piston area. When the valve piston is so caused to move leftward, fluid will be forced into the tube, equal in volume to the volume of the stem leaving the tube. Likewise, when the piston thereafter returns to rightward, the same volume of oil will be displaced out of the tube by volume of the stem entering the tube. The net effect is cancelling, resulting in an effectively balanced valve piston.

Since the force required to move the piston is minimal, the stem 13 can be quite small, thus minimizing the amount of "pumpint" displacement within the tube if it is anticipated that the fluid being pumped may contain a great amount of entrained ferrous particles which, as the fluid constantly transfers back and forth from tube to valve, might tend to collect on the magnet, and possibly cause restriction to movement in time.

As the valve piston reaches the rightward position in its bore, the magnet 33 is positioned in the chamber 45 directly adjacent to the reed switch 18. Magnetic flux coupling through the tube and the non-magnetic switch housing 19 causes the switch contacts 28 and 29 to be closed. When the valve piston moves to the left, the magnet 33 is withdrawn from the vicinity of the reed switch 18, the contacts of which then open. Rightward travel of the valve piston and magnet 33 will thereafter close the reed switch 18 again. With reference to the reed switch contacts, therefore, closed contacts indicate valve piston is rightward — open contacts indicate valve piston is leftward.

In certain types of application, a type C reed switch may be employed, having a single-pole, double-throw contact configuration with a common lead which is normally closed to a second lead, normally open to a third lead. Application of a magnetic field causes the contacts to transfer. In conjunction with the circuit of FIG. 6, however, the type A reed, or a reed switch with normally open contacts, is employed.

With the knowledge that the reed switch can be used electrically to indicate valve cycles, it is clear that if a constant (univarying) flow of lubricant is pumped through the valve manifold, the pistons and the various valves comprising the manifold will continuously cycle back and forth in positive displacement action, at a fixed cycling rate. The rate of piston movement will be directly proportional to the flow rate. Higher flow rate — more frequent cycling — lower flow rate — less frequent cycling.

The system described in this application is particularly well adapted for the dispensing of oil for cylinder wall and rod packing lubrication on large engine - compressor units which are used for pumping natural gas and like gaseous chemicals. These systems require low delivery oil metering along the several injection points and are commonly served by a constant delivery pump which is mechanically driven by the engine compressor unit to a power takeoff shaft.

Although oil delivery is low, (between 2 and 120 pints per day typically), the pump output is continuous and consequently, the primary manifold of the systems is caused to cycle at a constant rate. The reed switch 18 is attached to the primary manifold 11 and serves to time electrically the interval between switch closures. Once the pump flow rate is set, the primary manifold will cycle at a fixed rate of, say, once each 30 seconds. Every 30 seconds, therefore, the reed switch 18 will close its contacts. The reed switch will open after closing so that a pattern is established of a fixed period closed, fixed period open for the switch, repeating as the valve piston to which it is attached is alternately leftward, then rightward, on half cycles of the manifold. In practice, the open time period and the closed time period are not necessarily equal, varying in proportion of 40 to 60 percent typically. The time interval from switch closure to switch closure, however, remains quite uniform. This constant time interval is used as a flow monitoring means to operate an electrical solid state timing device with the reed switch. The timing circuit is adjustable. Although, not limited thereto, it may take the form of an "on delay" circuit.

The purpose of the timing operation is to detect unsafe conditions. For example, given a reed switch closure every 30 seconds for a known flow rate, it is considered that a drop in flow of 10 percent is an unsafe condition with respect to the volume of oil required. Lubricating systems of the type described are employed for engine compressor lubrication because the oil delivery can be reduced to a bare minimum, owing to the fact that the single line type metering system has the inherent feature of hydraulically signalling "trouble". Oil delivery becomes very critical, therefore, and a 10 percent drop in flow, such as may occur due to a loss of pump efficiency — dirty filter, or oil supply failure, will cause an expensive shutdown, due to scored cylinder walls. Prior to the development of the present invention, there had been no satisfactory device for indicating the 10 percent drop in flow. The apparatus described herein is relatively independent of viscosity changes as oil temperature varies.

The piston in the valve block 12' which is assumed to cycle once for each one hundredth of a pint of oil passing through, will be "timed" with the on delay solid state timer of FIG. 6. For the 30 second switch closure intervals previously mentioned, it is assumed that the cycling rate is linear with respect to oil delivery rate, although in actuality, it is an exponential function. A 10 percent drop in flow will then cause a cycle rate of the manifold and thus the interval between switch closures to drop to 33 seconds. The solid state timer of FIG. 6 is adjusted to "time out" in 33 seconds. Normally, with the 30 second switch closure rate, the timer comes within 3 seconds of timing out, but resets to zero each time the switch closes, and starts timing again. When a switch slows to 33 seconds, the timer timing out operates a relay, the contacts of which are used for giving a warning signal, or in the case of engine compressor lubrication systems, grounds the engine magneto to stop the engine compressor or to operate an electrical gas shut-off means.

The same method of operation can be obtained, using a C type reed switch single-pole, double-throw, wherein two timers are operated — one at each switch position, the time cycle on each one being adjusted in relation to the half cycles of the manifold which each one monitors. In this case, each timer resets when the reed switch contact transfers to energize the other timer.

A unique advantage of the single contact (type A) reed switch and a single timer which resets instantaneously each time the switch closes, is that a much more reliable circuit results and only one timing adjustment is required, thus reducing the timer adjustment period in half.

The solid state timer of FIG. 6 incorporates an adjustable long interval resistance-capacity timing circuit (resistors, capacity, and transistors), plus a second short interval timing circuit which resets the long interval circuit in a matter of milliseconds when the reed closes, then remains inactive in spite of the switch remaining closed, or opening. Immediately upon being reset, the long interval timing circuit starts to time again. In this way, only a single timer adjustment (variable resistance) is required.

Among the advantages of solid state timing circuitry are that:

1. No mechanical parts are involved which, cycling possibly over 1,000,000 times a year, would wear out. Timing devices such as used previously — synchronous, motor driven or solenoid operated, pneumatic, or hydraulic — pot type delayed timers, all involve the use of mechanical or electromechanical components, the life of which is normally rated only in hundredths of thousandths of cycles. Also, relatively high inrush currents are required of the actuating switch for these devices, whereas the current requirement for the solid state circuitry is normally in the microampere range. Life for solid state circuitry is considerably longer and limited only by the electrical history of the various components.

2. Solid state circuitry is infinitely faster in resetting to zero when the manifold switch closes. Electromechanical timers are generally spring reset. They have an inherent delay in both pull in and drop out (reset) times. Due to these delays, there is a certain limit to cycling rate which can be readily timed. If the time interval is so short as to be less than the pull in and drop out times, it is obviously impossible to use them for timing. Solid state circuitry, meanwhile, is capable of reacting in microseconds and thus can be operated at quite rapid timing rates. The reset time must be "robbed" from the total time cycle and it is, therefore, desirable to hold this interval to as short a time as possible.

Referring to FIG. 6, when the contacts of the reed switch 18 open, opening the discharge circuit of the condenser 61 and permit it to resume charging, there is a charging circuit from the positive current supply terminal 58 through the solid state rectifier 67, resistor 66, charging resistor 62, timing rheostat or adjustable resistor 24, the condenser 61, then back to the negative power supply terminal 59, through a conductor 108. The condenser 61 charges at a fixed rate. Although a charge takes place exponentially, the voltage applied is kept constant, so that a fixed time is required to reach a predetermined potential. The voltage between the terminal 64 and the conductor 108 is held constant by reason of the fact that the Zener diode voltage reference element 65, is connected across this charging circuit.

If the lubricating system is cycling normally, the piston of the valve block 12' will return to the position closing the reed switch 18 before the unijunction transistor 69 and the silicon controlled rectifier 68 have fired. Consequently, the condenser 61 will be discharged or reset by the closing of the switch 18 to commence another charging cycle, as previously described.

Resetting takes place, as follows: When the switch contacts of the reed switch 18 close, a circuit is formed from the positive current supply terminal 58, through the closed contacts of the reed switch 18, through a conductor 32, through the solid state rectifier 93, the terminal 96, the coupling condenser 94, the terminal 99, the solid state rectifier 97, current limiting resistor 98, so as to raise the potential of the base 89, of the transistor 86, above that of the emitter 88. In consequence, the transistor 86 becomes conducting, so as to complete a circuit through it from the terminal 83 of the condenser 61, a solid state rectifier 91, the collector 87, the emitter 88, and the load resistor 92, back to the negative plate of the condenser 61. The transistor 86, instantaneously drops to a negligible resistance, as soon as its base 89, is forward biased, as described. Consequently, a high conductivity discharge circuit is formed for the condenser 61, causing it to become discharged almost instantaneously, so that a new charging cycle can commence immediately.

On the other hand, if the lubricating system is not functioning properly with the pistons in the manifold 11 not moving at all, or moving too slowly, so that the reed switch 18 is not closed when the potential of the timing condenser 61 reaches the critical value at which the unijunction transistor 69 fires, the following action takes place: Initially, the silicon controlled rectifier 68 is cut off and there is no current flow through the winding 51. The timing condenser 61 is being charged through the resistors 62 and 63, until the voltage across the condenser 61 reaches the peak point voltage of the unijunction transistor 69, at which the unijunction transistor 69 fires.

This peak point voltage is determined by the resistance ratio between the resistors 79 and 81, and the adjustment of the tap 78, on the potentiometer 77. The peak point voltage of the unijunction transistor 69 is that at which the potential of the emitter 76 becomes greater than the voltage determined by the ratio of the voltage divider 79 and 81, causing the emitter 76 to become forward biased and the emitter current to flow. Emitter current increases, the resistance of base 74 drops and the circuit saturates. The firing of the unijunction transistor 69 generates a pulse across the resistor 81, which applied to the gate 73 of the silicon controlled rectifier 68, triggers the silicon controlled rectifier 68. The full supply voltage from the terminal 58, through the solid state diode rectifier 67, and closed manual reset switch 53 then appears across the control winding 51. A holding current for the silicon controlled rectifier 68 is provided by the current through the solid state rectifier 67 and the control winding 51.

When the full supply voltage is applied to the winding 51, the current therein causes the contacts 102 and 105 to shift, producing desired warning signals or shutting down the apparatus, as desired, according to the manner in which the switches 105 and 102 are connected. The timing circuit is then reset when desired by opening the switch 53 manually to open the circuit through the alarm relay winding 51 and the anode-cathode circuit 71-72 of the silicon controlled rectifier 68.

The condenser 94, diode 97 and resistor 98 comprise a second or short interval timing circuit for controlling the period during which transistor 86 conducts. Since the voltage applied across terminals 58 and 96 is DC, current will flow through the second timing circuit to the base 89 of transistor 86 only during transient conditions, i.e., until the voltage on condenser 94 builds up to a steady state condition. When the steady state condition of condenser 94 is reached, transistor 86 is turned off and the first timing circuit comprising charging resistor 62, timing rheostat 24 and condenser 61 begins timing.

Thus, if the reed switch 18 remains closed due to a defect in the lubrication system, then the potential on timing condenser 61 reaches the critical value at which the unijunction transistor 69 fires causing the silicon controlled rectifier 68 to conduct in the manner set forth above.

Figure 7:
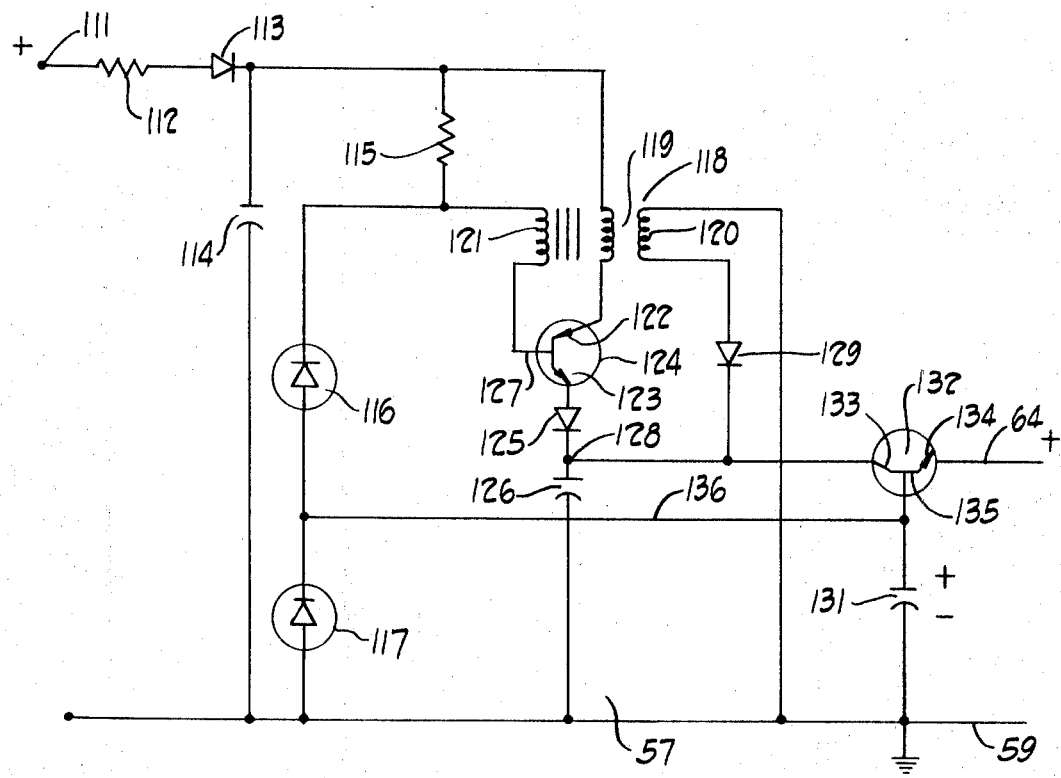
FIG. 7 is a circuit diagram of a converter for use when the current for actuating the system of FIGS. 1 to 6 is supplied by a magneto driven by an engine compressor which is being lubricated by the system.

If it is desired to obtain supply current for the timing circuit and the silicon controlled rectifier 68 from the from the magneto 56 of the pump drive, a converter 57 is employed which may have the circuit illustrated in FIG. 7. The positive terminal 111 of the magneto 56 is connected through a resistor 112 and the rectifier 113 across a condenser 114. A resistor 115 and two reversed bias diodes 116 and 117 are connected across the condenser 114 in series. A transformer 118 is provided, having three windings 119, 120 and 121. The primary winding 119 of the transformer 118 is connected across the condenser 114 in series with the collector 122, and the emitter 123 of a trigistor 124, a diode 125, and another condenser 126. The trigistor 124 has a base 127 connected through the tertiary winding 121 of the transformer 118 and the resistor 115 to the positive plate of the condenser 114. The winding 121 is connected with its polarity opposite to that of the primary winding 119.

A secondary winding 120 connected with the same polarity as the primary winding 119 is connected between the negative or ground terminal 59 and common terminal 128 of the rectifier 125 and condenser 126 through another rectifier 129. A condenser 131 is connected across the reverse biased rectifier 117. A voltage regulating transistor 132 is provided, shown as being of the NPN type. The collector 133 and the emitter 134 of the transistor 132 are connected in series between the terminal 128 and the positive regulated output terminal 64. The base 135 of the transistor 132 is connected to the junction of the reverse biased rectifiers 116 and 117.

When the voltage at the magneto terminal 111 rises, voltage at the base 127 of the trigistor 124 also rises, tending to reduce current flow through the trigistor 124 and diminish the voltage supply to the collector 133 of the transistor 132, and vice versa. The secondary winding 120 provides a positive pulse through the rectifier 129 to the collector 133 when the voltage at magneto terminal 111 falls and current is diminished through the primary winding 119. Thus a regulated output is applied to the output terminals 64 and 59.

Figure 8:
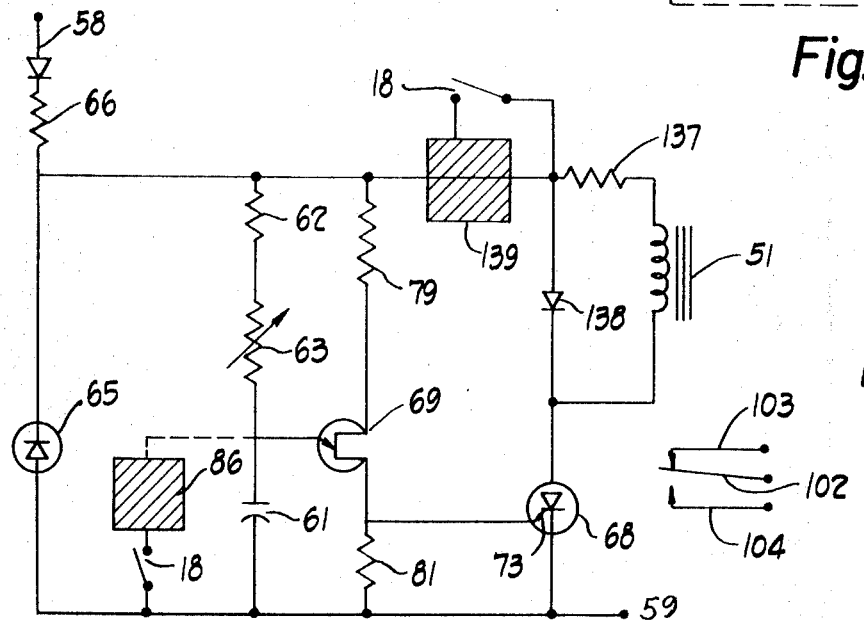
FIG. 8 is a circuit diagram of an alternative form of timing circuit.

In the detailed circuit arrangement illustrated in FIG. 6, resetting is accomplished by substantially, instantaneously discharging the timing condenser 61 each time the reed switch closes its contacts. However, the invention is not limited to specific circuit arrangement of FIG. 6. For example, as illustrated in FIG. 8, alternate positions for the reset circuitry may be employed in accordance with the invention. The silicon controlled rectifier circuit 68 and the unijunction transistor circuit 69 are supplied with current through direct-current terminals 58 and 59 and are controlled by the charging of the condenser 61 as described in connection with FIG. 6.

The silicon controlled rectifier 68 is connected to the positive current supply terminal 58 through the resistor 66 and a diode 138, with a resistor 137 interposed in the circuit to the control circuit winding 51. In the supply circuit of the silicon controlled rectifier 68 a reset circuitry 139 is provided which interrupts the power supply momentarily upon closure of the manifold cycle sensing switch, namely, the reed switch 18 in order to start a new charging cycle.

As explained in connection with FIG. 6, at the initiation of each condenser charging cycle the potential difference between the plates of the timing condenser 61 gradually rises. The condenser is charged through resistors 62 and 63 until the voltage across the condenser 61 reaches the peak point voltage of the unijunction transistor 69, at which time the unijunction transistor 69 fires, generating a pulse across the resistor 81 which triggers the silicon controlled rectifier 68. The full supply voltage minus the drop across the silicon controlled rectifier 68 then appears across the winding 51.

Holding current for the silicon controlled rectifier 68 is provided by the current through resistor 66 and the diode 138. When the silicon controlled rectifier 68 triggers, the voltage across the unijunction transistor 69 drops to less than 2 volts due to the clamping action of the rectifier 138. This acts to set rapidly and maintain a low voltage on the condenser 61 so that the time interval is maintained with reasonable accuracy.

When the reed switch 18 sensing the end of a cycle closes, momentarily interrupting the circuit to the silicon controlled rectifier 68, it loses control. This happens because the voltage across the unijunction transistor 69, and consequently also across the condenser 61 is of low value, insufficient to trigger the gage 63 of the silicon controlled rectifier 68. However, the condenser-charging current through the resistors 62 and 63 gradually charges the condenser raising its potential until the action previously described is repeated when the voltage across the condenser 61 reaches the peak point causing the silicon controlled rectifier 68 to fire. If the lubricating system is in order, the lubricating cycle is completed each time before the timing cycle is completed so that the condenser does not reach its peak value and the alarm relay contacts 102 are not actuated by the control winding 51, since the silicon controlled rectifier 68 is not fired.

When the alternate transistor, reset circuitry 86 is employed which discharges the timing condenser momentarily upon closure of the manifold cycle sensing switch 18', the action described in connection with FIG. 6 takes place. It will be understood that only one reset circuitry 86, or the other 139, is employed and not both and that the cycle-sensing switch is connected either at the position 18 or the position 18' and not at both positions.

Figure 9:
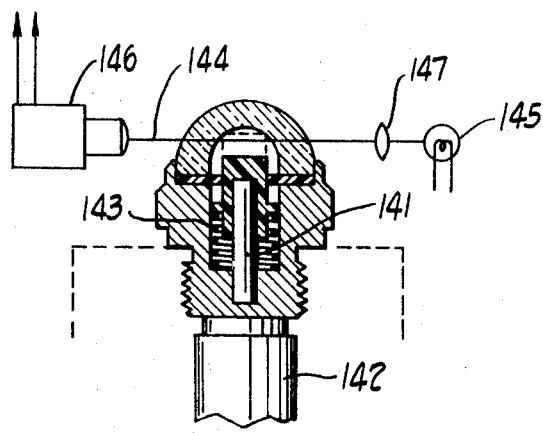
FIG. 9 is a diagram partially in section of an optical or photoelectric piston sensing system which may be employed in another embodiment of the invention.

The invention is not limited to the use of a reed type switch for resetting the solid state timing circuit. For example, as illustrated in FIG. 9, a magnetic indicator 141 in a nonmagnetic sealed housing may be employed, which is resiliently positioned upward and is attracted downward whenever the valve piston 142 of the valve block 12' is in the upward position. The magnet 141 is normally lifted by a biasing spring 143 so as to interrupt a light path 144 between a lamp 145 and a photocell pickup unit 146. It will be understood that preferably the light from lamp 145 is focused into a beam along the path 144 by means of a lens or lens system 147. The photocell pickup unit 146 is arranged to raise the potential of a base 89, which is shown in the solid state timing circuit of FIG. 6, whenever the magnet 141 is attracted downward to the position shown in FIG. 9 so as to reset the timing circuit by discharging the condenser 61 of FIG. 6.

Although the reed switch type of cycle-sensing control and the photo-interrupted light beam type of cycle-sensing control have been specifically illustrated and described it will be understood that the invention is not limited thereto and does not exclude the use of other types of cycle-sensing such as by means of variable inductance, consisting of a coil around a nonferrous tube, a ferrous stem only moving within the tube so as to vary the coil inductance during cycling of the valve piston; or induced electromotive force consisting of a coil around a nonferrous tube and the magnet inside the tube, which in moving back and forth induces a current flow in the coil to trigger the reset-timing circuit; or an audio device which would "hear" the "click" of the valve piston striking the end bore plug as it comes to a halt at the end of its stroke; or the use of more than one proximity sensors — that is, sensing more than one piston position with other solid state circuitry which times not one cycle but rather half cycles in the manifold, or simply the time required for a piston to transfer or shuttle across its valve bore from one end to the other; or circuitry for timing for more than one cycle through the use of a "cascade" or counting network which would for instance time for 10 cycles of the manifold and then be reset; or resistance-delay networks instead of condenser-charging circuits; or inductance-condenser circuitry or inductance-resistance circuitry.

Figure 10:
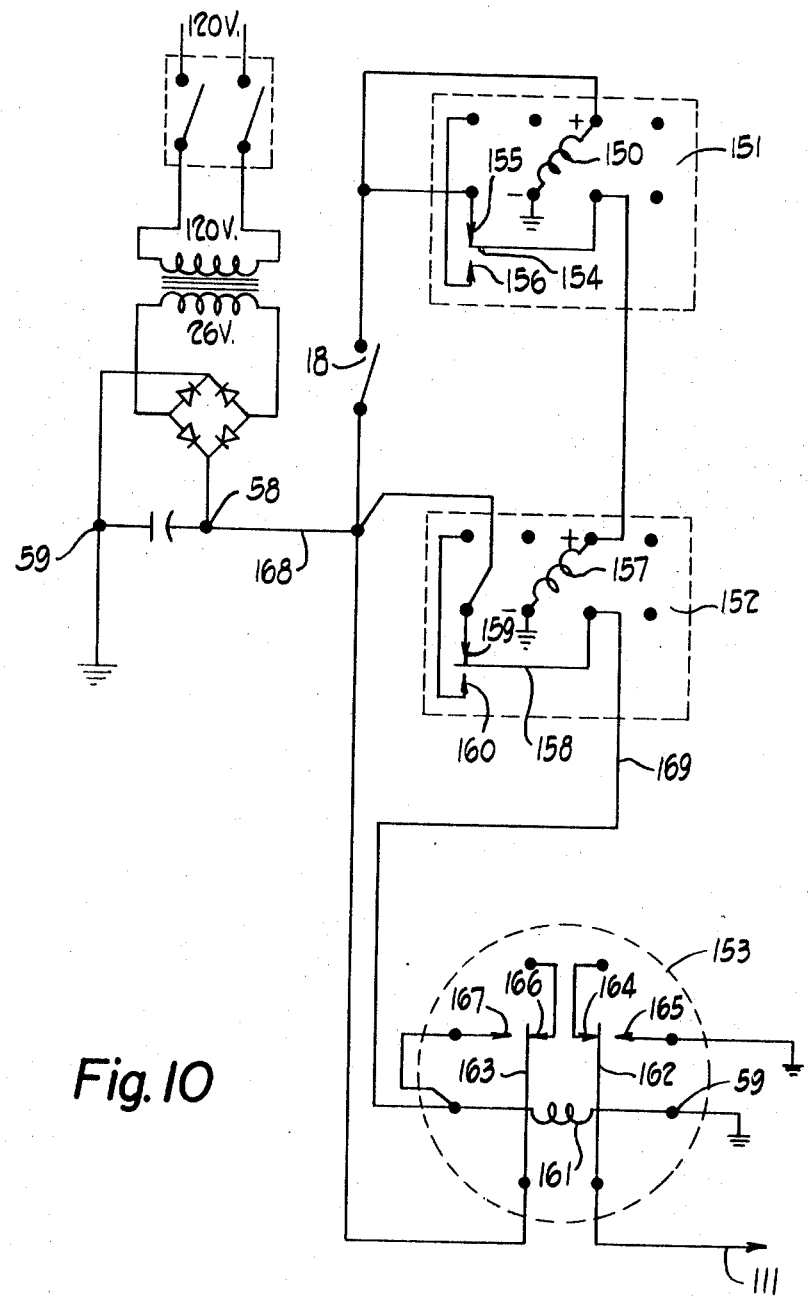
FIG. 10 is a circuit diagram of still another embodiment of the invention in which timing circuits are employed in conjunction with each other.

The solid state timing means with resistance-condenser circuitry with reset feature does not exclude the use of either on-delay charging timing or off-delay timing nor piston-sequence timing nor does the invention exclude the use of inductance-condenser timing circuitry with the various types of timing hereinbefore mentioned. For example, as illustrated in FIG. 10, the reed switch 18 may be employed for controlling two different on-delay timers 151 and 152 acting in conjunction with adjustable flow-monitoring timer 153 which is always set for a greater time delay than the timer 152, having the least time delay. For instance, the timers 151 and 152 may be 4-second and 2-second on-delay timers respectively, with the adjustable flow-monitoring timer 153 being set for some value between 2 seconds and 300 seconds. The 4-second on-delay timer 151 has a control winding 150 actuating a movable contact 154 cooperating with a normally closed stationary contact 155 and a normally open stationary contact 156. The 2-second on-delay timer 152 has a winding 157 actuating a movable contact 158 cooperating with a normally closed stationary contact 159 and a normally open contact 160.

The adjustable flow-monitoring timer has a winding 161 actuating a pair of movable contacts 162 and 163. The movable contact 162 cooperates with a normally closed stationary contact 164 and a normally open stationary contact 165. The movable contact 163 cooperates with a normally closed stationary contact 166 and a normally open stationary contact 167.

Initially, before the reed switch 18 has closed and while it is open, the adjustable timer 153 is energized and is timing out. The energizing circuit for the winding 161 takes place from the positive current supply terminal 58 through the conductor 168 normally closed stationary contact 159 of the 2-second on-delay timer 152, the movable contact 158, conductor 169, the winding 161 back to the negative or ground terminal 59.

Two seconds after the reed switch 18 has closed, the 2-second timer 152 times out thus interrupting the circuit to the adjustable flow-monitoring timer 153 causing the adjustable timer 153 to reset.

Two seconds later, namely, at the end of 4 seconds, from the time that the reed switch has closed, the 4-second fixed-delay timer 151 has timed out, opening the circuit between contacts 154 and 155, thus interrupting power to the 2-second fixed-delay timer 152. The adjustable delay timer 153 is now reenergized and starts timing again. If the reed switch 18 remains closed as a result of a defect in the lubrication system for a longer time delay, the adjustable timer 153 closes its contacts and a circuit between contacts 162 and 165 to ground the magneto terminal 111 and interrupt the operation of the engine compressor.

Although the timers 151, 152 and 153 have been shown in block form in FIG. 10, it will be understood that they are preferably of a solid state type with the windings 154 and 157 and 161 corresponding to the winding 51 of FIG. 6 and the movable contacts 154, 158 and 162 and 163 corresponding to one or the other of the movable contacts 102 and 105 of FIG. 6.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended, therefore, to cover all such modifications and variations as fall within the scope of the invention.

What is claimed is:

1. In a flow-monitoring system having a cyclic manifold and a piston which moves in response to fluid being supplied to said manifold,
    a source of electrical power,
    a warning device and a solid state switching device interconnected between said source and said warning device, said solid state switching device adapted to selectively energize said warning device in the event fluid does not flow within a predetermined interval of time,
    a control for said switching device comprising a switch which opens and closes in response to the movement of said piston, an energy storage device which charges at a predetermined rate when the switch is open, means for discharging said electrical energy storage device when said switch is closed, means for causing said energy storage device to charge when said switch remains closed for a predetermined interval of time, and a trigger circuit responsive to the charge on said electrical storage device for selectively activating said solid state switching device when said charge exceeds a predetermined value whereby said warning device is energized.

2. The flow-monitoring system of claim 1 wherein said electrical storage device is a condenser.

3. The flow-monitoring system in claim 1 wherein said discharge means includes a transistor which is rendered conductive when said switch is closed thereby providing a discharge path for said energy storage device.

4. The flow-monitoring system in claim 3 wherein said means for causing said energy storage device to charge when said switch remains closed for a second predetermined interval of time includes a timing means adapted to render said transistor nonconductive after said second predetermined interval of time.

5. The flow-monitoring system in claim 4 wherein said timing means comprises a resistor and condenser.

6. The flow-monitoring system of claim 1 wherein said trigger circuit includes a unijunction transistor which is activated when the charge on said energy storage device reaches a predetermined level.

7. In a flow-monitoring system having a cyclic manifold and a piston which moves in response to fluid being supplied to said manifold, a source of electrical power, a warning device and a solid state switching device interconnected between said source and said warning device, said solid state switching device adapted to selectively energize said warning device in the event fluid does not flow within a first predetermined interval of time, a control for said switching device comprising a switch which opens and closes in response to the movement of said piston, a condenser which charges at a predetermined rate when the switch is open, means for discharging said condenser including a transistor which is rendered conductive when said switch is closed thereby providing a discharge path, a timing means adapted to render said transistor nonconductive thereby causing said condenser to charge at said predetermined rate when said switch remains closed for a second predetermined interval of time, and a trigger circuit responsive to the charge on said electrical storage device for selectively activating said solid state switching device when said charge exceeds a predetermined value whereby said warning device is energized.

8. The flow-monitoring system of claim 7 wherein said timing means comprises a resistor and a capacitor.

* * * * *